US012610027B2

(12) United States Patent　　(10) Patent No.:　US 12,610,027 B2

Mountasir　　(45) Date of Patent:　Apr. 21, 2026

(54) UNDERWATER VIDEO MONITORING ASSEMBLY AND METHOD OF USE

(71) Applicant: Taha Mountasir, Santee, CA (US)

(72) Inventor: Taha Mountasir, Santee, CA (US)

( * ) Notice: Subject to any disclaimer, the term of this patent is extended or adjusted under 35 U.S.C. 154(b) by 52 days.

(21) Appl. No.: 18/615,661

(22) Filed: Mar. 25, 2024

(65) Prior Publication Data

US 2025/0301103 A1　　Sep. 25, 2025

(51) Int. Cl.
| | |
|---|---|
| *H04N 7/18* | (2006.01) |
| *G08B 21/18* | (2006.01) |
| *H04N 23/51* | (2023.01) |
| *H04N 23/54* | (2023.01) |
| *H04N 23/698* | (2023.01) |
| *G06V 40/10* | (2022.01) |

(52) U.S. Cl.
CPC ............. *H04N 7/181* (2013.01); *G08B 21/18* (2013.01); *H04N 23/51* (2023.01); *H04N 23/54* (2023.01); *H04N 23/698* (2023.01); *G06V 40/10* (2022.01)

(58) Field of Classification Search
CPC .......... H04N 7/183; G06T 2207/10016; G01S 15/96
USPC .......................................................... 348/38
See application file for complete search history.

(56) References Cited

U.S. PATENT DOCUMENTS

| | | | |
|---|---|---|---|
| 4,753,031 A | 6/1988 | Owen | |
| 6,115,060 A * | 9/2000 | Rowley ................... | B63C 11/49 |
| | | | 348/148 |
| D452,696 S | 1/2002 | Fenton | |
| 7,646,675 B1 * | 1/2010 | McGonegal ............ | G01S 7/539 |
| | | | 367/107 |
| 10,694,082 B2 | 6/2020 | Immel | |
| 2003/0151514 A1 | 8/2003 | Sargent | |
| 2006/0023570 A1 * | 2/2006 | Betts ........................ | G01S 7/521 |
| | | | 367/88 |
| 2009/0128623 A1 | 5/2009 | Whittle | |
| 2011/0202278 A1 * | 8/2011 | Caute ...................... | G01S 7/521 |
| | | | 702/14 |
| 2012/0306644 A1 | 12/2012 | Campbell | |
| 2014/0057677 A1 | 2/2014 | Liubinas | |
| 2014/0071167 A1 * | 3/2014 | Lauenstein ............. | G01S 15/96 |
| | | | 345/440 |

(Continued)

FOREIGN PATENT DOCUMENTS

| | | | |
|---|---|---|---|
| WO | WO-03102516 A2 * | 12/2003 | ............. A01K 97/00 |
| WO | WO2021099604 | 5/2021 | |

*Primary Examiner* — Justin W Rider

(57) ABSTRACT

An underwater video monitoring assembly for monitoring objects in proximity to a boat includes a set of video capturing modules and a computer, which are mountable to a hull of a boat and to the boat, respectively. The computer comprises an onboard transceiver. An onboard display is operationally engaged to the computer and is mountable to the boat. Each video capturing module comprises a transparent housing. A camera and a transmitter are attached to and positioned in the transparent housing, with the transmitter being communicatively engaged to the camera. The camera captures video in a space around the hull and the transmitter transmits the video to the computer, which evaluates an object in the video and selectively signals the onboard display to present one or more of a position of the object, a proximity warning, and a threat warning.

15 Claims, 8 Drawing Sheets

(56) References Cited

U.S. PATENT DOCUMENTS

| 2014/0269162 A1* | 9/2014 | Antao | G01S 7/629 |
| | | | 342/146 |
| 2022/0004761 A1 | 1/2022 | Biancale | |
| 2022/0011428 A1 | 1/2022 | Brandon | |
| 2022/0392351 A1 | 12/2022 | Biancale | |

* cited by examiner

UNDERWATER VIDEO MONITORING ASSEMBLY AND METHOD OF USE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to security monitoring assemblies and more particularly pertains to a new security monitoring assembly for monitoring objects in proximity to a boat. Underwater objects present both potential opportunities, such as game fish and viewing opportunities, and potential dangers, such as sharks, jellyfish, and obstacles, which can impact lives of boaters. A security monitoring assembly that identifies potential opportunities and potential dangers would be of benefit to boaters.

(2) Description of Related Art Including Information Disclosed Under 37 CFR 1.97 and 1.98

The prior art relates to security monitoring assemblies, and in particular security monitoring assemblies for boats. The prior art does not teach such an assembly having the components and capabilities disclosed herein.

(h) BRIEF SUMMARY OF THE INVENTION

An embodiment of the disclosure meets the needs presented above by generally comprising a set of video capturing modules and a computer, which are configured to be mountable to a hull of a boat and to the boat, respectively. An onboard display is operationally engaged to the computer and is configured to be mountable to the boat. Each video capturing module comprises a transparent housing, which defines an interior space. A camera and a transmitter are attached to the transparent housing and are positioned in the interior space, with the transmitter being communicatively engaged to the camera. The camera is configured to capture video in a space around the hull and the transmitter is configured to transmit the video. The computer comprises an onboard transceiver and is programmed to receive and to evaluate an object in the video that is captured by the cameras and to selectively signal the onboard display to present one or more of a position of the object, a proximity warning, and a threat warning.

Another embodiment of the disclosure includes an underwater video monitoring system, which comprises a boat to which has been mounted the underwater video monitoring assembly, according to the disclosure above.

Yet another embodiment of the disclosure includes a method of monitoring objects in proximity to a boat. The method entails provision of the underwater video monitoring assembly, according to the disclosure above. Step of the method include mounting the video capturing modules to a hull of a boat, mounting the computer and the onboard display to the boat, capturing video in a space around the hull, transmission of the video to the computer, evaluation by the computer of an object in the video, and presenting one or more of a position of the object, a proximity warning, and a threat warning on the onboard display.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
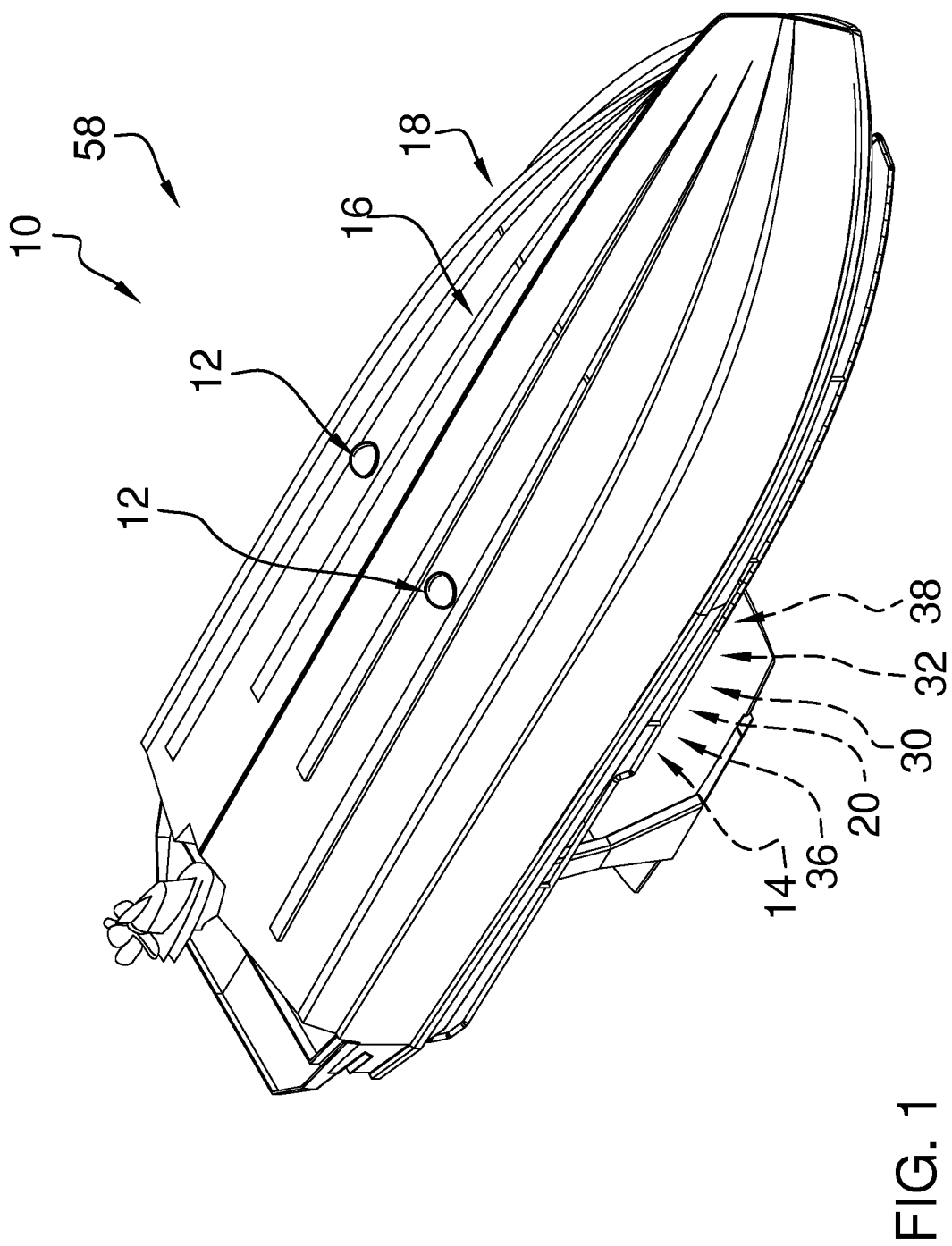
FIG. 1 is a bottom isometric perspective view of an underwater video monitoring assembly according to an embodiment of the disclosure.

With reference now to the drawings, and in particular to FIGS. 1 through 8 thereof, a new security monitoring assembly embodying the principles and concepts of an embodiment of the disclosure and generally designated by the reference numeral 10 will be described.

As best illustrated in FIGS. 1 through 8, the underwater video monitoring assembly 10 generally comprises a set of video capturing modules 12 and a computer 14, which are configured to be mountable to a hull 16 of a boat 18 and to the boat 18, respectively. An onboard display 20 is operationally engaged to the computer 14 and is configured to be mountable to the boat 18. Each video capturing module 12 comprises a transparent housing 22, which defines an interior space 24. A camera 26 and a transmitter 28 are attached to the transparent housing 22 and are positioned in the interior space 24, with the transmitter 28 being communicatively engaged to the camera 26. The camera 26 is configured to capture video in a space around the hull 16 and the transmitter 28 is configured to transmit the video. The computer 14 comprises an onboard transceiver 30 and is programmed to receive and to evaluate an object in the video that is captured by the cameras 26 and to selectively signal the onboard display 20 to present one or more of a position of the object, a proximity warning, and a threat warning.

An onboard speaker 32 is operationally engaged to the computer 14 and is configured to be mountable to the boat 18. The computer 14 is positioned to selectively actuate the onboard speaker 32 to broadcast the position of the object, the proximity warning, and the threat warning. The present invention also anticipates the computer 14, the onboard display 20, and the onboard speaker 32 being integral to the boat 18, as many boats 18 are manufactured with such components.

A database 34, which is positioned on the computer 14, comprises images of objects which might be encountered by the boat 18, such as fish, rocks, trees, jellyfish, squid, or the like. The computer 14 is programmed to compare the object in the video that is captured by the cameras 26 to the images in the database 34 to identify the object in the video and to signal the onboard display 20 to present the identity of the object. The database 34 also comprises feeding patterns of game fish and the computer 14 is programmed to signal the onboard display 20 to present a bait or a lure that is appropriate for a game fish in the video that is captured by the cameras 26.

The database 34 also comprises regulations regarding catch limits and size limits for game fish. The computer 14 is programmed to signal the onboard display 20 to present the catch limits and the size limits for a game fish in the video that is captured by the cameras 26. A receiver 36, which is Global Positioning System enabled and operationally engaged to the computer 14, is configured to receive positional coordinates of the boat 18. The computer 14 is programmed to signal the onboard display 20 to present site specific catch limits and size limits, based on the position of the boat 18, for the game fish in the video captured by the cameras 26. The computer 14 also is programmed to store in the database 34 a video of a release of a game fish that is captured by the cameras 26, thereby allowing the user to verify and to document compliance with regulations regarding size limits on game fish.

Figure 3:
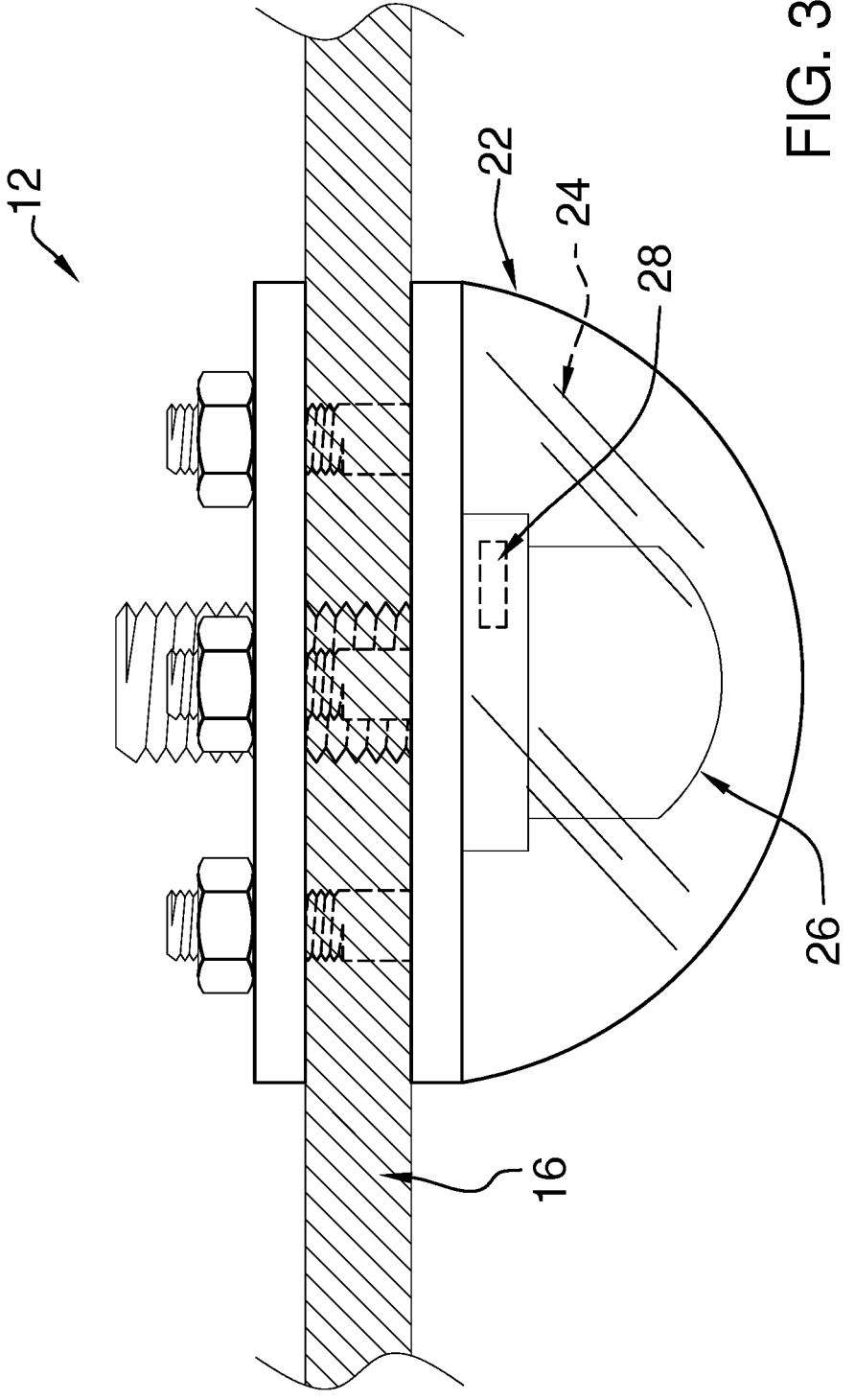
FIG. 3 is a detail view of an embodiment of the disclosure.
Figure 4:
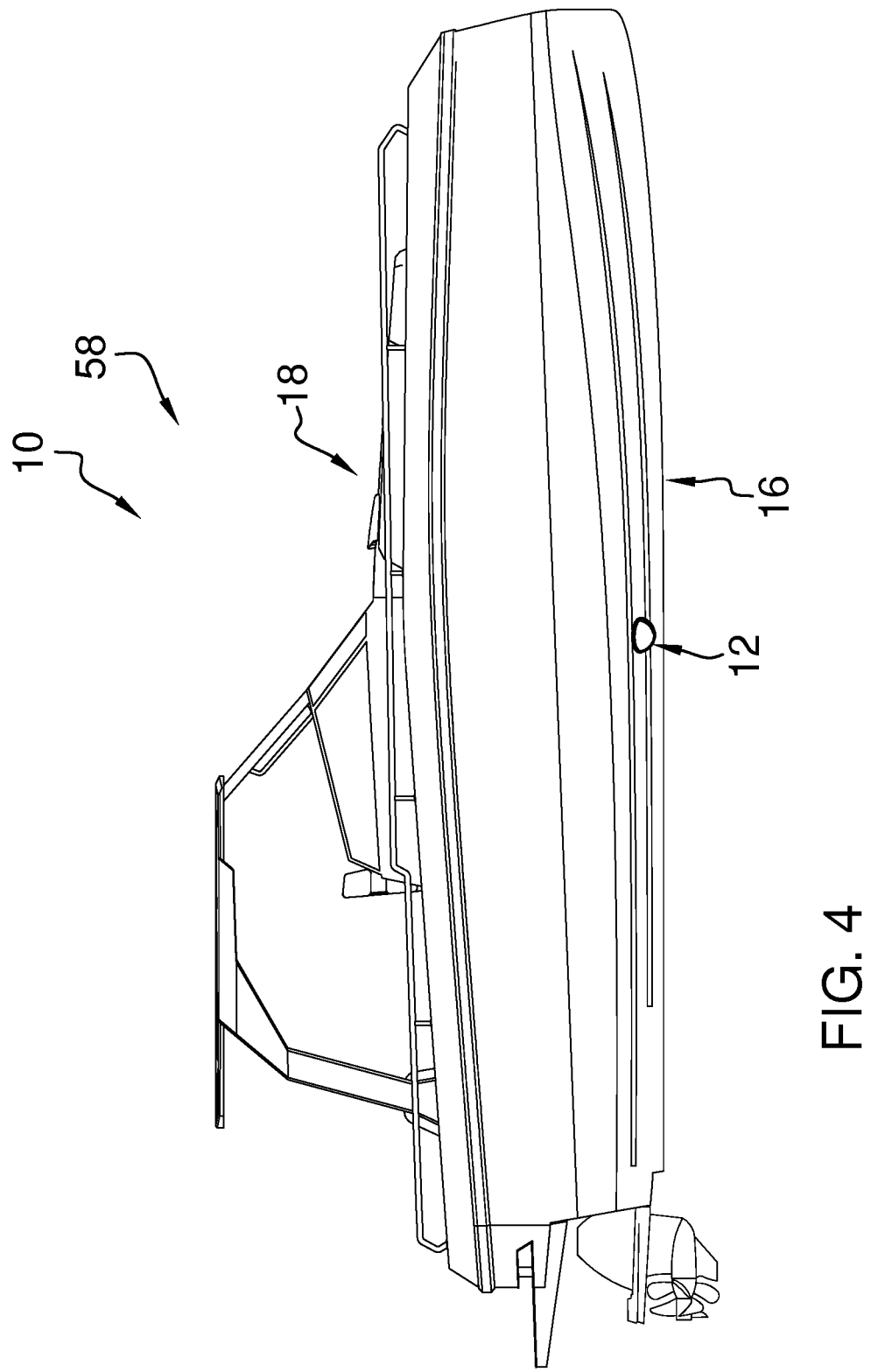
FIG. 4 is a side view of an embodiment of the disclosure.
Figure 5:
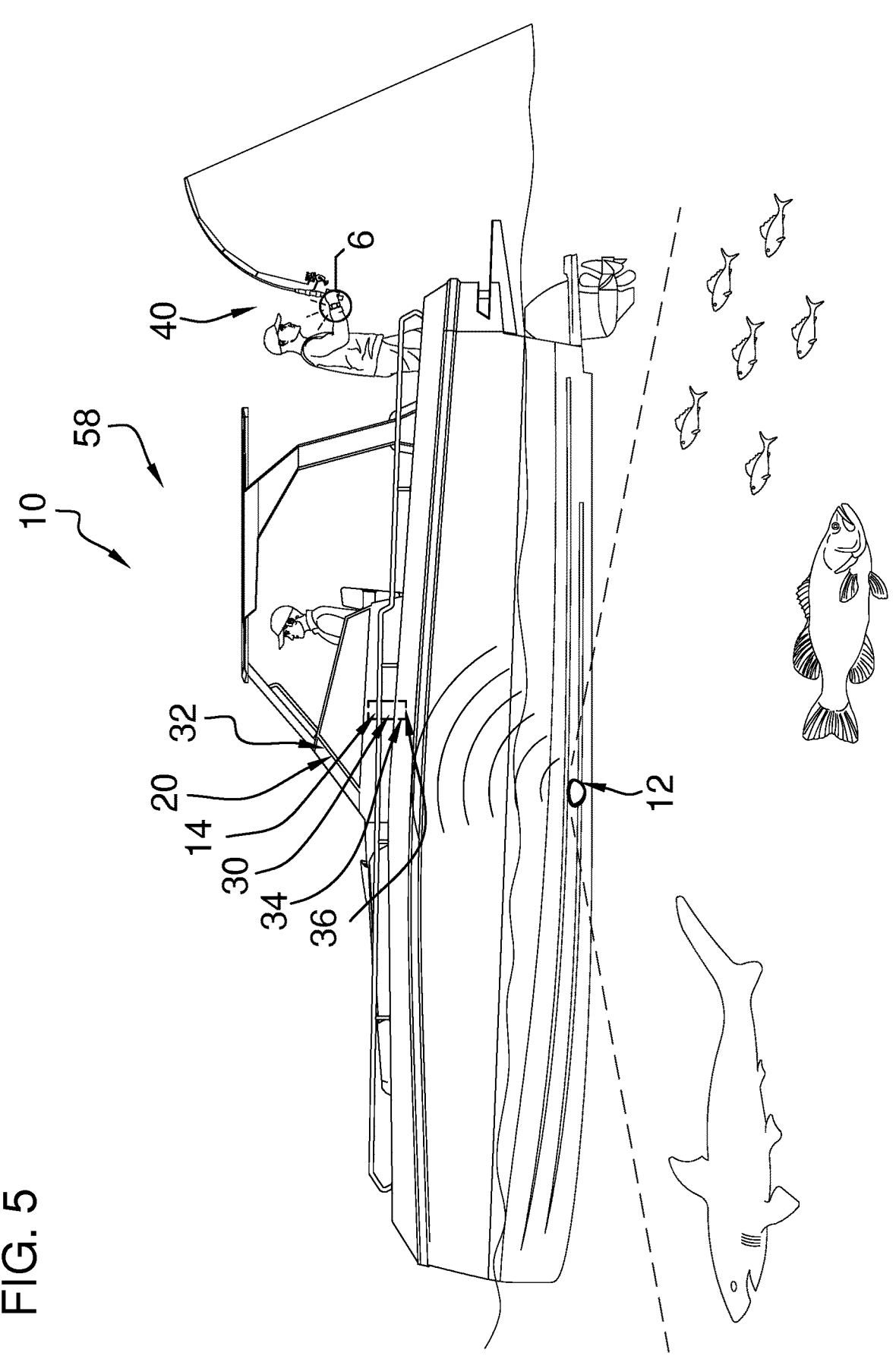
FIG. 5 is an in-use view of an embodiment of the disclosure.
Figure 6:
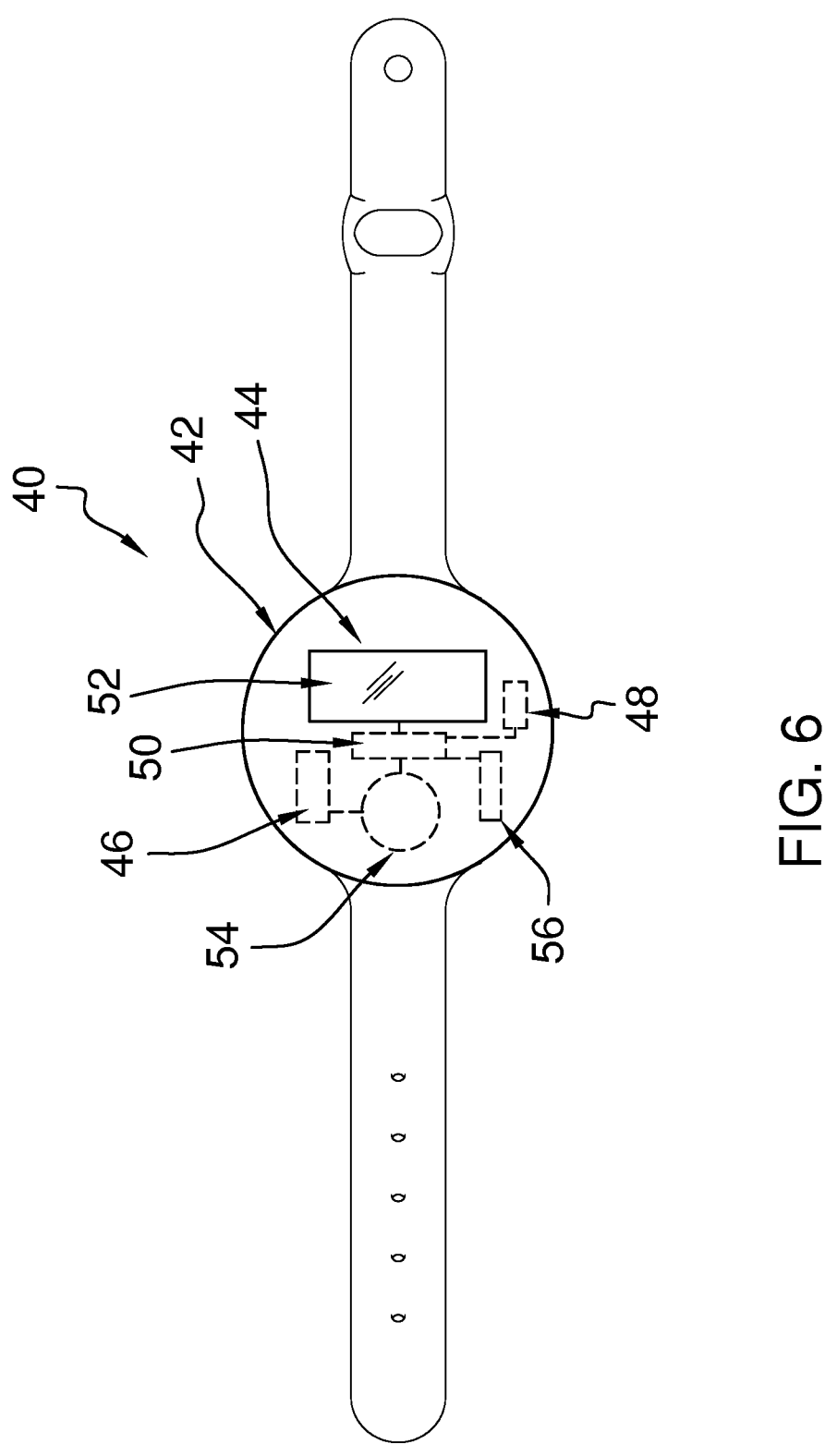
FIG. 6 is an detail view of an embodiment of the disclosure.
Figure 7:
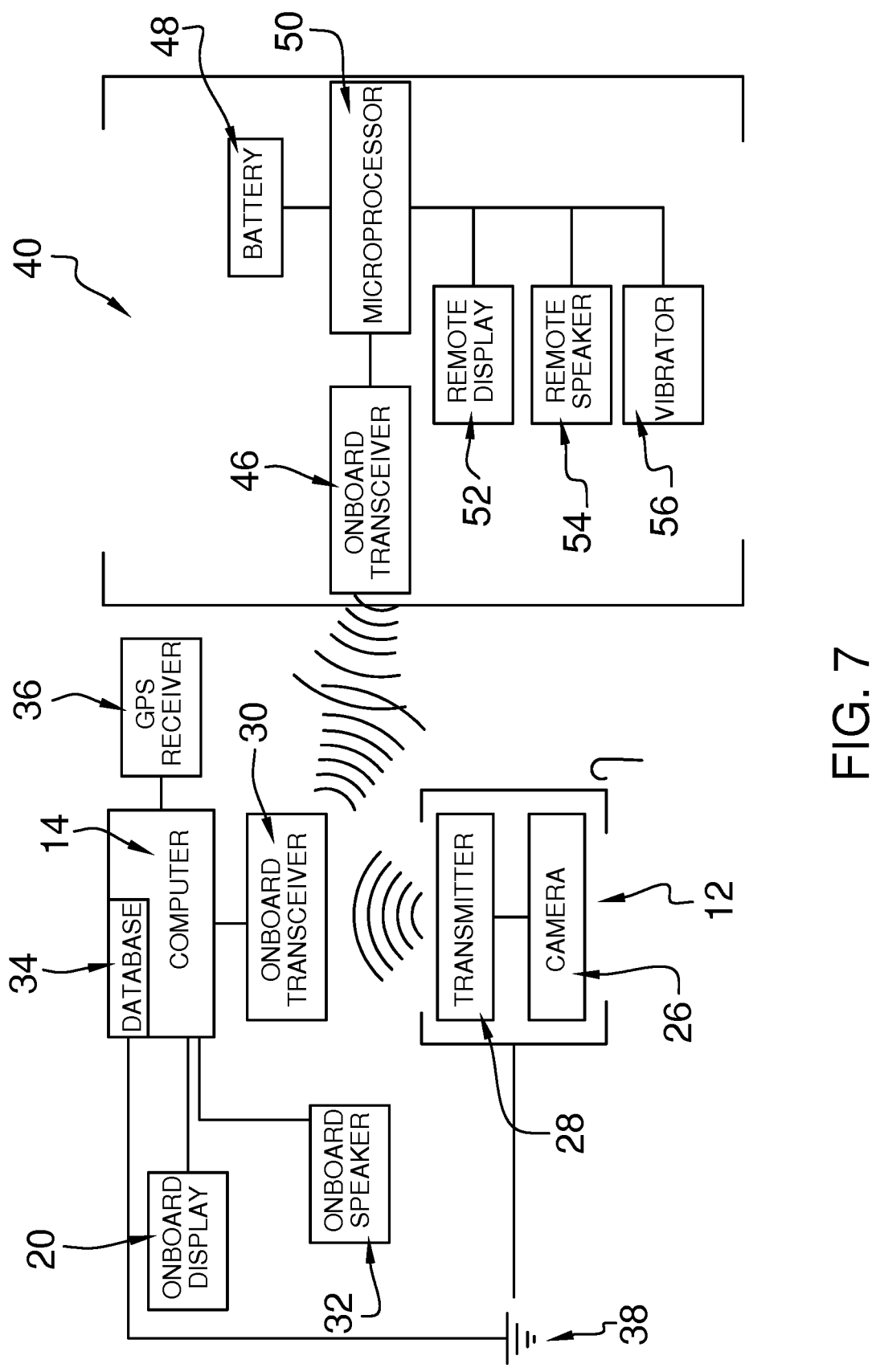
FIG. 7 is a block diagram of an embodiment of the disclosure.
Figure 8:
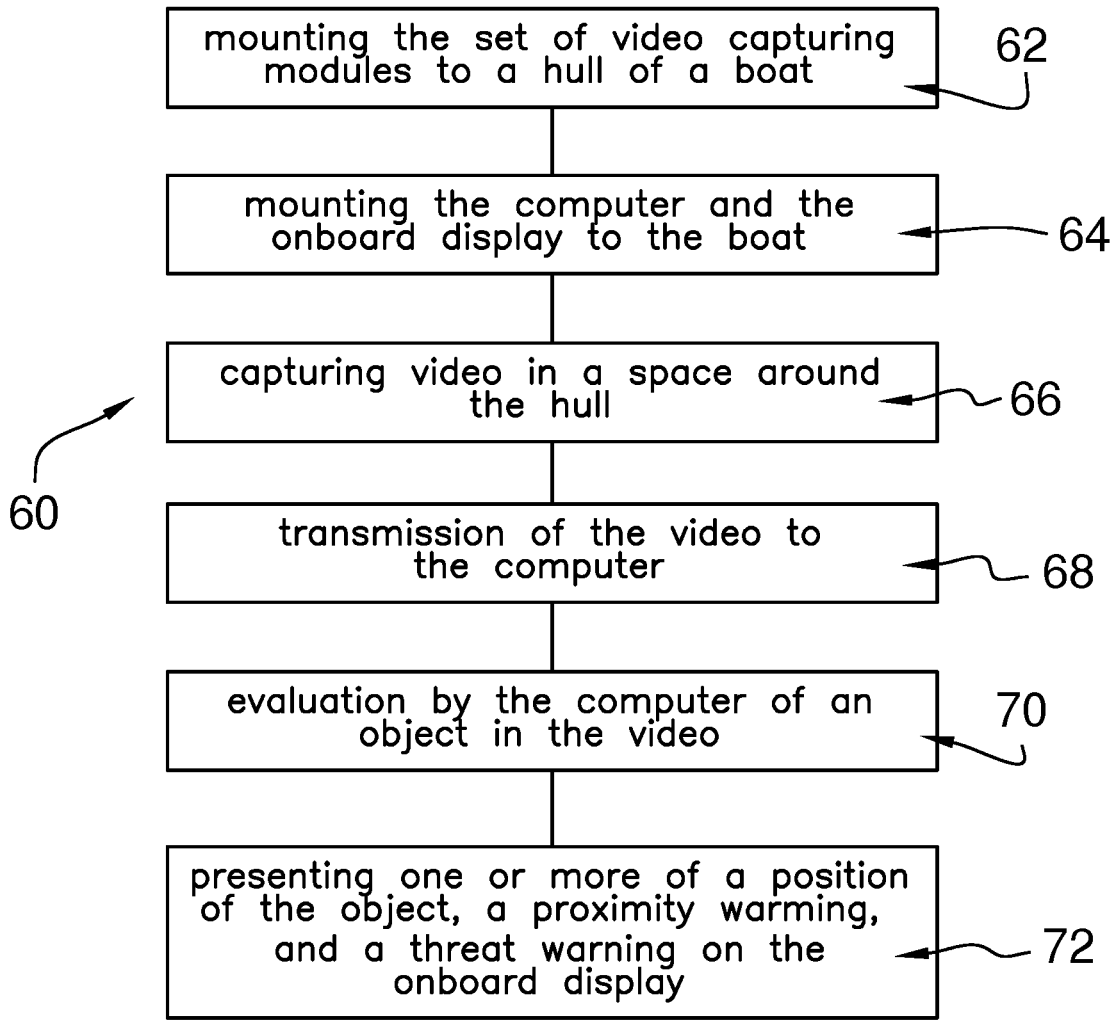
FIG. 8 is a flow diagram for a method utilizing an embodiment of the disclosure.

Each video capturing module 12 may be mounted to the hull 16 as depicted in FIG. 3, wherein a video capturing module 12 is shown bolted to a hull 16 of a boat 18. The means by which the video capturing modules 12 are mounted to the hull 16 is not critical to the invention, and other mounting means, such as, but not limited to, adhesive mounting, welding, or the like, are anticipated by the present invention. The set of video capturing modules 12 and the computer 14 may be configured to be operationally engaged to an electrical circuit 38 of the boat 18, although the present invention also anticipates the set of video capturing modules 12 and the computer 14 being battery powered.

Figure 2:
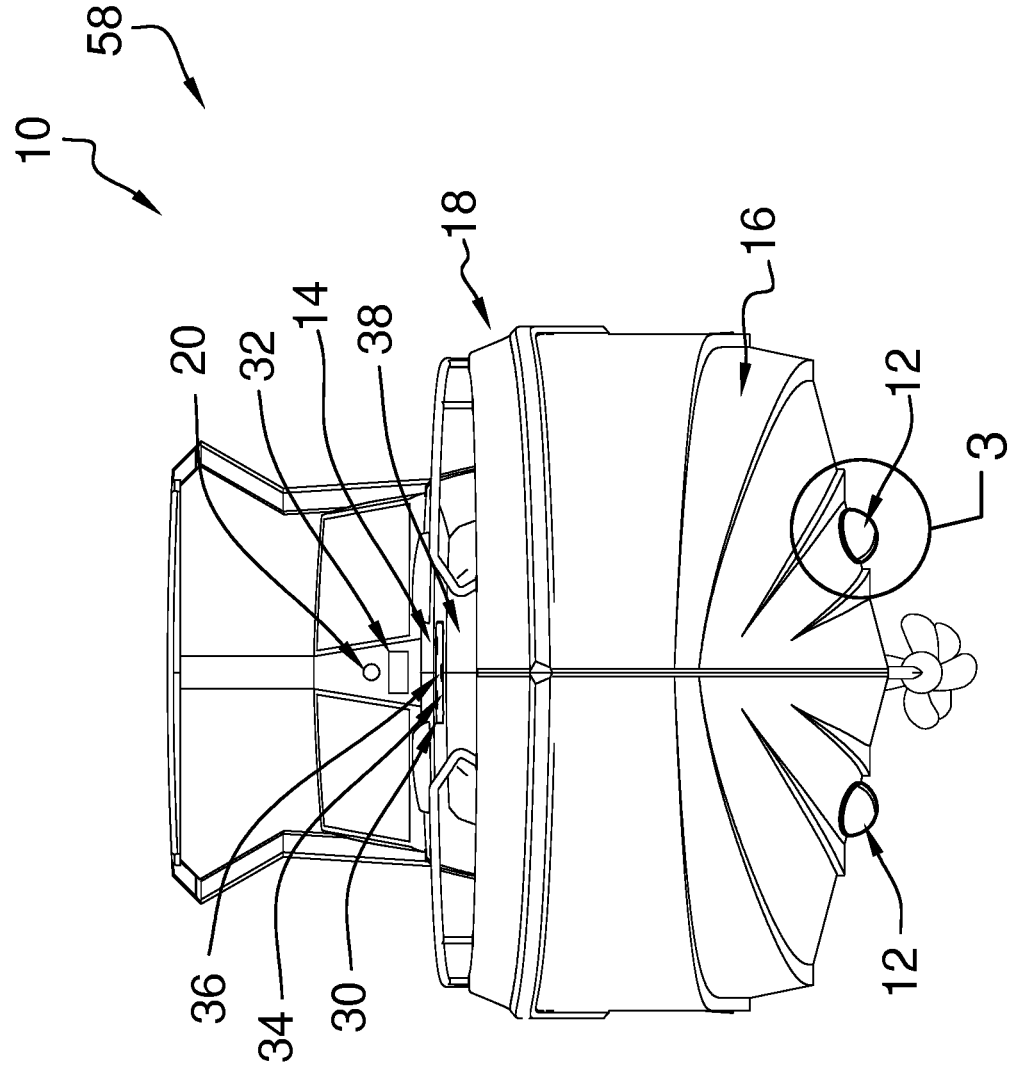
FIG. 2 is a front view of an embodiment of the disclosure.

The set of video capturing modules 12 comprises from one to six video capturing modules 12. The video capturing modules 12 may comprise two video capturing modules 12, as is shown in FIGS. 1 and 2. The camera 26 is configured to capture video of at least a 60.0° of the space around the boat 18. The camera 26 may be configured to capture video of at least a 120.0° of the space around the boat 18. The camera 26 also may be configured to capture video of at least a 180.0° of the space around the boat 18. The camera 26 also may be configured to capture video of 360.0° of the space around the boat 18. One advantage to the set of video capturing modules 12 comprising two or more video capturing modules 12 is that, with two or more cameras 26 capturing video of an object, a size of the object and its distance from the boat 18 can be calculated. The present invention anticipates the computer 14 being programmed to perform such calculations.

While the present invention is anticipated to provide substantial entertainment value to the user, its primary functions are more utilitarian. Specifically, the underwater video monitoring assembly will detect and warn the user of potentially dangerous conditions proximate to the boat 18, such as the presence of a shark, jellyfish, or the like. Additionally, by detecting underwater obstacles, such as rocks, trees, or the like, the underwater video monitoring assembly 10 can warn the user and help to prevent impact of the hull 16 with the underwater obstacles, thereby decreasing a risk of damage to the boat 18 and injury to the user.

The underwater video monitoring assembly 10 also may include a remote device 40, which may be configured to be worn upon a wrist of the user. The remote device 40 comprises a remote housing 42, which defines an internal space 44. A remote transceiver 46, a battery 48, and a microprocessor 50 are attached to the remote housing 42 and are positioned in the internal space 44. A remote display 52 is attached to the remote housing 42. The microprocessor 50 is operationally engaged to the remote transceiver 46, the remote display 52, and the battery 48. The remote transceiver 46 is positioned to relay signals from the computer 14 to the microprocessor 50, positioning the microprocessor 50 to acuate the remote display 52 to selectively present the position of the object, the proximity warning, and the threat warning.

A remote speaker 54 is attached to the remote housing 42 and is operationally engaged to the microprocessor 50. The microprocessor 50 is positioned to selectively actuate the remote speaker 54 to broadcast the position of the object, the proximity warning, and the threat warning. A vibrator 56 is attached to the remote housing 42, is positioned in the internal space 44, and is operationally engaged to the microprocessor 50. The microprocessor 50 is positioned to selectively actuate the vibrator 56, upon receipt of the proximity warning or the threat warning, to provide a vibratory notification to the user. The underwater video monitoring assembly 10, once installed on a boat 18, also could be used for security monitoring of the boat 18 when the boat 18 is trailered or drydocked, with the remote device 40 comprising a smartphone, or the like.

The present invention also anticipates an underwater video monitoring system 58, which comprises a boat 18 to which has been mounted the underwater video monitoring assembly 10, according to the specification above.

In use, the underwater video monitoring assembly 10 enables a method of monitoring objects in proximity to a boat 60. The method 60 comprises providing the underwater video monitoring assembly 10, according to the specification above. A first step 62 of the method 60 is mounting the set of video capturing modules 12 to a hull 16 of a boat 18. A second step 64 of the method 60 is mounting the computer 14 and the onboard display 20 to the boat 18. A third step 66 of the method 60 is capturing video in a space around the hull 16. A fourth step 68 of the method 60 is transmission of the video to the computer 14. A fifth step 70 of the method 60 is evaluation by the computer 14 of an object in the video. A sixth step 72 of the method 60 is presenting one or more of a position of the object, a proximity warning, and a threat warning on the onboard display 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An underwater video monitoring assembly comprising:
   a set of video capturing modules configured to be mountable to a hull of a boat, each video capturing module of the set of video capturing modules comprising:
   a transparent housing defining an interior space;
   a camera attached to the transparent housing and positioned in the interior space, the camera being configured to capture video in a space around the hull; and
   a transmitter attached to the transparent housing, positioned in the interior space, and communicatively engaged to the camera, such that the transmitter is configured for transmission of the video captured by the camera;
   a computer configured to be mountable to the boat, the computer comprising an onboard transceiver and being programmed to receive and to evaluate an object in the video captured by the cameras;
   an onboard display operationally engaged to the computer and being configured to be mountable to the boat, such that the computer is positioned to selectively signal the onboard display to present one or more of a position of the object, a proximity warning, and a threat warning;
   a database positioned on the computer, the database comprising images of objects which might be encountered by the boat, the computer being programmed to compare the object in the video captured by the cameras to the images in the database to identify the object in the video and to signal the onboard display to present the identity of the object, wherein the database comprises feeding patterns of game fish, the computer being programmed to signal the onboard display to present a bait or lure appropriate for a game fish in the video captured by the cameras, wherein the database comprises regulations regarding catch limits and size limits for game fish, the computer being programmed to signal the onboard display to present the catch limits and the size limits for a game fish in the video captured by the cameras; and
   wherein the computer is programmed to store in the database a video of a release of a game fish captured by the cameras.

2. The underwater video monitoring assembly of claim 1, wherein the set of video capturing modules and the computer are configured to be operationally engaged to an electrical circuit of the boat.

3. The underwater video monitoring assembly of claim 1, wherein:
   the set of video capturing modules comprises from one to six video capturing modules; and
   the camera is configured to capture video of at least a 60.0° of the space around the boat.

4. The underwater video monitoring assembly of claim 3, wherein the camera is configured to capture video of at least a 120.0° of the space around the boat.

5. The underwater video monitoring assembly of claim 3, wherein the camera is configured to capture video of at least a 180.0° of the space around the boat.

6. The underwater video monitoring assembly of claim 3, wherein the camera is configured to capture video of 360.0° of the space around the boat.

7. The underwater video monitoring assembly of claim 3, wherein:
   the video capturing modules comprising two video capturing modules; and
   the camera being configured to capture video of 360.0° of the space around the boat.

8. The underwater video monitoring assembly of claim 1, further including an onboard speaker operationally engaged to the computer and being configured to be mountable to the boat, such that the computer is positioned to selectively actuate the onboard speaker to broadcast the position of the object, the proximity warning, and the threat warning.

9. The underwater video monitoring assembly of claim 1, further including a receiver operationally engaged to the computer, the receiver being Global Positioning System enabled, wherein the receiver is configured to receive positional coordinates of the boat, the computer being programmed to signal the onboard display to present site specific catch limits and size limits for the game fish in the video captured by the cameras.

10. The underwater video monitoring assembly of claim 1, further including a remote device comprising:
   a remote housing defining an internal space;
   a remote transceiver attached to the remote housing and positioned in the internal space;
   a remote display attached to the remote housing and positioned in the internal space;
   a battery attached to the remote housing and positioned in the internal space; and
   a microprocessor attached to the remote housing, positioned in the internal space, and operationally engaged to the remote transceiver, the remote display, and the battery, such that the remote transceiver is positioned to relay signals from the computer to the microprocessor, positioning the microprocessor to acuate the remote display to selectively present the position of the object, the proximity warning, and the threat warning.

11. The underwater video monitoring assembly of claim 10, wherein the remote device is configured to be worn upon a wrist of the user.

12. The underwater video monitoring assembly of claim 10, further including the remote device comprising a remote speaker attached to the remote housing and operationally engaged to the microprocessor, such that the microprocessor is positioned to selectively actuate the remote speaker to broadcast the position of the object, the proximity warning, and the threat warning.

13. The underwater video monitoring assembly of claim 1, further including the remote device comprising a vibrator attached to the remote housing, positioned in the internal space, and operationally engaged to the microprocessor, such that the microprocessor is positioned to selectively actuate the vibrator, upon receipt of the proximity warning or the threat warning, to provide a vibratory notification to the user.

14. The underwater video monitoring assembly of claim 1, further including:

the set of video capturing modules being configured to operationally engage an electrical circuit of the boat, the set of video capturing modules comprising from one to six video capturing modules, the video capturing modules comprising two video capturing modules;

the camera being configured to capture video of at least a 60.0° of the space around the boat, the camera being configured to capture video of at least a 120.0° of the space around the boat, the camera being configured to capture video of at least a 180.0° of the space around the boat, the camera being configured to capture video of 360.0° of the space around the boat;

the computer is programmed to be operationally engaged to an electrical circuit of the boat;

an onboard speaker operationally engaged to the computer and being configured to be mountable to the boat, such that the computer is positioned to selectively actuate the onboard speaker to broadcast the position of the object, the proximity warning, and the threat warning;

a receiver operationally engaged to the computer, the receiver being Global Positioning System enabled, wherein the receiver is configured to receive positional coordinates of the boat, the computer being programmed to signal the onboard display to present site specific catch limits and size limits for the game fish in the video captured by the cameras; and a remote device, the remote device being configured to be worn upon a wrist of the user, the remote device comprising:

a remote housing defining an internal space;

a remote transceiver attached to the remote housing and positioned in the internal space;

a remote display attached to the remote housing and positioned in the internal space;

a battery attached to the remote housing and positioned in the internal space;

a microprocessor attached to the remote housing, positioned in the internal space, and operationally engaged to the remote transceiver, the remote display, and the battery, such that the remote transceiver is positioned to relay signals from the computer to the microprocessor, positioning the microprocessor to acuate the remote display to selectively present the position of the object, the proximity warning, and the threat warning;

a remote speaker attached to the remote housing and operationally engaged to the microprocessor, such that the microprocessor is positioned to selectively actuate the remote speaker to broadcast the position of the object, the proximity warning, and the threat warning; and a vibrator attached to the remote housing, positioned in the internal space, and operationally engaged to the microprocessor, such that the microprocessor is positioned to selectively actuate the vibrator, upon receipt of the proximity warning or the threat warning, to provide a vibratory notification to the user.

15. An underwater video monitoring system comprising a boat to which has been mounted the underwater video monitoring assembly of claim 1.

* * * * *